United States Patent
Fukuoka et al.

(10) Patent No.: US 10,737,940 B2
(45) Date of Patent: Aug. 11, 2020

(54) COMPLEXES OF CALCIUM PHOSPHATE MICROPARTICLES AND FIBERS AS WELL AS PROCESSES FOR PREPARING THEM

(71) Applicant: NIPPON PAPER INDUSTRIES CO., LTD., Tokyo (JP)

(72) Inventors: Moe Fukuoka, Tokyo (JP); Toru Nakatani, Tokyo (JP); Shisei Goto, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 168 days.

(21) Appl. No.: 15/757,787

(22) PCT Filed: Sep. 8, 2016

(86) PCT No.: PCT/JP2016/076476
§ 371 (c)(1),
(2) Date: Mar. 6, 2018

(87) PCT Pub. No.: WO2017/043585
PCT Pub. Date: Mar. 16, 2017

(65) Prior Publication Data
US 2018/0346333 A1    Dec. 6, 2018

(30) Foreign Application Priority Data
Sep. 8, 2015    (JP) .................. 2015-176317

(51) Int. Cl.
*C01B 25/32*    (2006.01)
*D21H 17/66*    (2006.01)
(Continued)

(52) U.S. Cl.
CPC .............. *C01B 25/32* (2013.01); *C01B 25/45* (2013.01); *C01F 11/181* (2013.01); *D21H 11/16* (2013.01);
(Continued)

(58) Field of Classification Search
CPC ......... C01B 25/32; C01B 25/45; D21H 11/16; D21H 17/70; D21H 17/66; D21H 17/63;
(Continued)

(56) References Cited

U.S. PATENT DOCUMENTS 4,654,314 A    3/1987    Takagi et al.
5,043,017 A *  8/1991    Passaretti .............. C01F 11/185
                                                             106/465
(Continued)

FOREIGN PATENT DOCUMENTS

JP    H03-051396 A    3/1991
JP    H05-222693 A    8/1993
(Continued)

OTHER PUBLICATIONS

International Search Report for Application No. PCT/JP2016/076476, dated Dec. 6, 2016. 3 pages.
(Continued)

*Primary Examiner* — Anthony J Zimmer
(74) *Attorney, Agent, or Firm* — McCarter & English, LLP; Steven G. Davis; Wei Song (57) ABSTRACT

The present invention aims to provide techniques for preparing complexes of calcium phosphate particles and a fiber. According to the present invention, complexes of calcium phosphate particles and a fiber are provided. According to the present invention, calcium phosphate-fiber complexes in which titanium is retained can be further obtained.

10 Claims, 4 Drawing Sheets

(51) Int. Cl.
*D21H 17/70* (2006.01)
*C01B 25/45* (2006.01)
*D21H 11/16* (2006.01)
*C01F 11/18* (2006.01)

(52) U.S. Cl.
CPC ............. *D21H 17/66* (2013.01); *D21H 17/70* (2013.01); *C01P 2004/03* (2013.01); *C01P 2004/61* (2013.01); *C01P 2004/62* (2013.01)

(58) Field of Classification Search
CPC .... D21H 17/67; D21H 17/675; D21H 17/679; C01F 11/181; C01P 2004/62; C01P 2004/61; C01P 2004/03
See application file for complete search history.

(56) References Cited

U.S. PATENT DOCUMENTS

| | | | |
|---|---|---|---|
| 5,275,699 A | | 1/1994 | Allan et al. |
| 5,545,240 A | | 8/1996 | Tsuru et al. |
| 5,593,488 A | * | 1/1997 | Wu .................. C09C 1/021 106/464 |
| 5,698,265 A | | 12/1997 | Mucalo et al. |
| 5,711,799 A | * | 1/1998 | Snowden ............ D21H 17/675 106/465 |
| 2007/0131360 A1 | | 6/2007 | Sipila et al. |
| 2007/0148078 A1 | * | 6/2007 | Skuse ...................... B01J 8/226 423/432 |
| 2009/0148489 A1 | * | 6/2009 | Cooper ................. A61L 27/446 424/423 |
| 2015/0152573 A1 | | 6/2015 | Kogai et al. |

FOREIGN PATENT DOCUMENTS

| | | |
|---|---|---|
| JP | H08-260348 A | 10/1996 |
| JP | H10-182491 A | 7/1998 |
| JP | 2000-170092 A | 6/2000 |
| JP | 2000-271488 A | 10/2000 |
| JP | 2005-307406 A | 11/2005 |
| JP | 2007-528947 A | 10/2007 |
| JP | 2009-298666 A | 12/2009 |
| JP | 2011-73891 A | 4/2011 |
| JP | 2011-116601 A | 6/2011 |
| JP | 2013-234110 A | 11/2013 |
| JP | 2013-241690 A | 12/2013 |
| WO | 1994/008086 A1 | 4/1994 |
| WO | 2013/154070 A1 | 10/2013 |
| WO | 2013/191221 A1 | 12/2013 |

OTHER PUBLICATIONS

Supplementary European Search Report for Application No. 16844446.1, dated Feb. 26, 2019, 10 pages.

* cited by examiner

COMPLEXES OF CALCIUM PHOSPHATE MICROPARTICLES AND FIBERS AS WELL AS PROCESSES FOR PREPARING THEM

CROSS-REFERENCE TO RELATED APPLICATIONS

This application is a U.S. national stage filing, under 35 U.S.C. § 371(c), of International Application No. PCT/JP2016/076476, filed on Sep. 8, 2016, which claims priority to Japanese Patent Application No. 2015-176317, filed on Sep. 8, 2015. The entire contents of each of the aforementioned applications are incorporated herein by reference.

TECHNICAL FIELD

The present invention relates to complexes of calcium phosphate microparticles and fibers as well as processes for preparing them. In particular, the present invention relates to complexes comprising calcium phosphate microparticles having an average primary particle size of 5 μm or less adhered to the surface of a fiber and processes for preparing them.

BACKGROUND ART

In general, calcium carbonates are mainly classified into "natural calcium carbonates" prepared by mechanically grinding and classifying natural limestone, weathered shell or the like and "synthetic calcium carbonates" (precipitated calcium carbonates) prepared by chemically reacting limestone. Known processes for synthesizing the synthetic calcium carbonates include the carbonation process, the lime-soda process, and the soda process, among which the lime-soda process and the soda process are employed for some special applications while the carbonation process is typically employed for industrial synthesis of calcium carbonates.

Synthesis of a calcium carbonate by the carbonation process takes place by reacting quick lime and carbonic acid gas, and typically comprises a slaking step in which water is added to quick lime CaO to give slaked lime Ca$(OH)_2$, and a carbonation step in which carbonic acid gas $CO_2$ is injected into the slaked lime to give the calcium carbonate $CaCO_3$. Currently, various techniques for controlling the particle shape or particle size or the like of the product calcium carbonate have been proposed by regulating reaction conditions in synthesis steps of the calcium carbonate, especially the carbonation step.

Various techniques for depositing calcium carbonate on fibers such as pulps have also been proposed. PTL 1 describes a complex comprising a crystalline calcium carbonate mechanically bonded on a fiber. PTL 2 describes a technique for preparing a complex of a pulp and a calcium carbonate by precipitating the calcium carbonate in a suspension of the pulp by the carbonation process. PTL 3 describes a technique for improving the brightness and purity of a waste paper fiber by adding a large amount of a filler for papers and paperboards to the fiber, which comprises sending a slurry of a waste paper pulp to a gas-liquid contactor where the pulp is broken down by contact with a slurry of an alkali salt travelling in a counter-flow direction to the flow direction of the pulp in a contact/breaking zone and sending a suitable reactive gas and mixing it with the precipitating filler to deposit the filler on the surface of the fiber.

In addition, PTLs 4 and 5 disclose techniques for preparing a fiber web (wet paper) in which a calcium carbonate has been efficiently incorporated by depositing the calcium carbonate in the step of forming the fiber web.

On the other hand, calcium phosphates are known as inorganic salts of calcium. Calcium phosphates are salts composed of calcium ions and phosphate ions or diphosphate ions, and about 70% of bone consists of one type of calcium phosphates known as hydroxyapatite. Calcium phosphates are used for the preparation of fertilizers and also used as food additives for the preparation of foods such as cheese. Further, calcium phosphates are also widely used as toothpastes and supplements for promoting tooth remineralization. Such calcium phosphates have high adsorbent function so that they would be usable as functional base materials such as filters if they could be complexed with a fiber. PTL 6 discloses a technique for forming a complex with a calcium phosphate and a fiber, comprising converting a cellulose fiber into a phosphate ester under high temperature conditions of 100° C. or more in advance, and immersing it in a solution containing calcium ions or the like for about 10 days, and further in a solution containing phosphate ions or the like for about 10 days.

Additionally, titanium is widely used as a photocatalytic material. However, it had drawbacks such as low retention when it is internally added to paper; decomposition of pulp fibers by the catalytic effect of titanium after long exposure to light; etc. In order to solve these problems, PTL 7 discloses that a calcium carbonate and titanium are aggregated with a high-molecular polymer in advance and used as a filler. Further, PTL 8 discloses a method for synthesizing a complex of a calcium carbonate and titanium, comprising adding titanium during the synthesis of the calcium carbonate.

CITATION LIST

Patent Literature

PTL 1: JPA 1994-158585
PTL 2: U.S. Pat. No. 5,679,220
PTL 3: U.S. Pat. No. 5,665,205
PTL 4: JPA 2013-521417
PTL 5: US Patent Publication No. 2011/0000633
PTL 6: JPA 1996-260348
PTL 7: JPA 2004-18336
PTL 8: JPA 2003-062469

SUMMARY OF INVENTION

Technical Problem

The present invention aims to provide complexes of calcium phosphate microparticles and a fiber as well as techniques for efficiently preparing them. It also aims to provide such complexes bearing titanium, and techniques for efficiently preparing them.

In general, calcium phosphates are widely used for various applications, and further expected to show unique characteristics by forming a complex with them and fibers. Especially, inorganic particles such as calcium phosphates are too cohesive to dry in the dispersed state and to concentrate when their primary particle size decreases to less than several micrometers. Therefore, calcium phosphate microparticles are expected to be easily handled and readily employed for various applications if they are complexed with fibers.

Solution to Problem

We found that complexes of a calcium phosphate and a fiber can be obtained by reacting phosphoric acid and a calcium source in the presence of the fiber. In particular, we accomplished the present invention on the basis of the finding that calcium carbonate microparticles having a small primary particle size form a stable complex with a fiber by synthesizing the complex of the calcium carbonate microparticles and the fiber in advance and that when the complex is reacted with phosphoric acid, a complex of a calcium phosphate having a small particle size and the fiber can be obtained efficiently. Further, we found that a titanium-bearing complex of a calcium phosphate and a fiber can be obtained efficiently by adding titanium to the reaction solution before adding phosphoric acid.

Especially according to preferred embodiments of the present invention, a complex of a calcium carbonate having a small primary particle size and a fiber can be prepared efficiently by synthesizing the calcium carbonate in the presence of cavitation bubbles, and a complex of a calcium phosphate and the fiber can be obtained by reacting the calcium carbonate with phosphoric acid. In the complex obtained by the present invention, the calcium phosphate microparticles adhered to the fiber have a very uniform shape and unique characteristics can be conferred on the fiber. Further, the microparticles can be dehydrated/dried into a form that is easy to handle because they are adhered to the fiber.

Thus, the present invention includes, but not limited to, the following:
(1) A complex of calcium phosphate particles having an average primary particle size of 5 μm or less and a fiber.
(2) The complex of (1), wherein the calcium phosphate particles have an average primary particle size of 1 μm or less.
(3) The complex of (1) or (2), wherein the fiber is a pulp fiber.
(4) The complex of any one of (1) to (3), wherein the weight ratio between the calcium phosphate particles and the fiber is 5:95 to 95:5.
(5) The complex of any one of (1) to (4), further comprising titanium retained in it.
(6) A sheet comprising the complex of any one of (1) to (5).
(7) A process for preparing a complex of calcium phosphate particles having an average primary particle size of 5 μm or less and a fiber by reacting a calcium source and a phosphate source in a solution containing the fiber.
(8) The process of (7), comprising: synthesizing a calcium carbonate in a solution containing a fiber to give a complex of calcium carbonate particles having an average primary particle size of less than 5 μm and the fiber; and reacting the complex with phosphoric acid to give a complex of a calcium phosphate and the fiber.
(9) The process of (8), comprising synthesizing a calcium carbonate in a solution containing a fiber in the presence of cavitation bubbles.
(10) The process of (8) or (9), wherein the calcium carbonate particles have an average primary particle size of 1 μm or less.
(11) The process of any one of (8) to (10), comprising synthesizing a calcium carbonate by reacting an aqueous suspension of slaked lime and a gas containing carbon dioxide in the presence of cavitation bubbles.
(12) The process of any one of (8) to (11), wherein the cavitation bubbles are generated by injecting a liquid into a reaction vessel.
(13) The process of any one of (8) to (12), wherein the fiber comprises a pulp fiber.
(14) The process of any one of (8) to (13), wherein the cavitation bubbles are generated by injecting an aqueous suspension of slaked lime into a reaction vessel.
(15) The process of any one of (8) to (14), wherein the reaction solution circulated from the reaction vessel is used as the aqueous suspension of slaked lime.
(16) The process of any one of (8) to (15), comprising reacting phosphoric acid in the presence of titanium to give a calcium phosphate-fiber complex in which titanium is retained.
(17) A product comprising the complex of any one of (1) to (5).
(18) The product of (17), which is in the form of a sheet.

Advantageous Effects of Invention

According to the present invention, complexes of a calcium phosphate having an average primary particle size of 5 μm or less and a fiber can be prepared with good efficiency. In especially preferred embodiments, the particle size of the inorganic microparticles adhered to the fiber can be reduced by synthesizing a calcium carbonate using cavitation bubbles in the presence of the fiber.

Further in the present invention, titanium can be retained in the form of titanium dioxide or the like in the complexes by reacting a calcium carbonate and phosphoric acid in the presence of titanium.

Further in preferred embodiments according to the present invention, calcium phosphate-fiber complexes sufficiently retained in the products (articles) prepared therefrom and having high adsorbent/deodorant effects can be obtained. In addition, the complexes obtained by the present invention can be readily formed into sheets having a high ash content.

The reason why fine inorganic microparticles can be adhered onto a fiber efficiently by synthesizing a calcium carbonate in the presence of cavitation bubbles in a solution containing the fiber is not known in detail, but can be explained by the following assumption though the present invention is not bound to it. That is, it is assumed that the dissolution/microdispersion efficiency of carbonic acid gas is improved by the generation of cavitation under pressure and the reaction is activated by fine bubbles generated by the cavitation so that calcium carbonate microparticles are prepared with good efficiency and that the calcium carbonate microparticles are deposited on the surface of the fiber serving as a carrier for the calcium carbonate, whereby a complex having unique characteristics could be obtained. Further, it is assumed that a complex comprising calcium carbonate microparticles firmly bound to a fiber could be obtained because calcium ions adsorbed on the surface of the fiber and penetrated into it combine with carbonic acid gas. Thus, a calcium phosphate-fiber complex having excellent quality can be obtained by preparing the calcium phosphate-fiber complex from such a calcium carbonate-fiber complex.

DESCRIPTION OF EMBODIMENTS

Calcium Phosphate-Fiber Complexes

The present invention relates to complexes of a calcium phosphate having an average primary particle size of 5 μm or less and a fiber as well as processes for preparing them. In one embodiment, a calcium phosphate-fiber complex of the present invention can be obtained by, for example, reacting a calcium carbonate-fiber complex with phosphoric acid. In another embodiment, a complex of a calcium phosphate and a fiber can also be synthesized by reacting the fiber, phosphoric acid and a calcium source.

In one embodiment of the present invention, the reaction product complex is obtained as a suspension so that it can be stored in a storage tank or subjected to processing such as concentration, dehydration, grinding, classification, aging, or dispersion, as appropriate. These can be accomplished by known processes, which may be appropriately selected taking into account the purposes, energy efficiency and the like. For example, the concentration/dehydration process is performed by using a centrifugal dehydrator, thickener or the like. Examples of such centrifugal dehydrators include decanters, screw decanters and the like. If a filter or dehydrator is used, the type of it is not specifically limited either, and those commonly used can be used, including, for example, pressure dehydrators such as filter presses, drum filters, belt presses and tube presses or vacuum drum filters such as Oliver filters or the like, which can be suitably used to give a calcium carbonate cake. Grinding means include ball mills, sand grinder mills, impact mills, high pressure homogenizers, low pressure homogenizers, Dyno mills, ultrasonic mills, Kanda grinders, attritors, millstone type mills, vibration mills, cutter mills, jet mills, breakers, beaters, single screw extruders, twin screw extruders, ultrasonic stirrers, juicers/mixers for home use, etc. Classification means include sieves such as meshes, outward or inward flow slotted or round-hole screens, vibrating screens, heavyweight contaminant cleaners, lightweight contaminant cleaners, reverse cleaners, screening testers and the like. Dispersion means include high speed dispersers, low speed kneaders and the like.

The complexes obtained by the present invention can be compounded into fillers or pigments as a suspension without being completely dehydrated, or can be dried into powders. The dryer used in the latter case is not specifically limited either, but air-flow dryers, band dryers, spray dryers and the like can be suitably used, for example.

The present invention relates to complexes of a calcium phosphate and a fiber, and in a preferred embodiment, 15% or more of the surface of the fiber is covered by the calcium phosphate. In a preferred embodiment of the complexes of the present invention, the ratio (area ratio) at which the fiber is covered by the calcium phosphate is 25% or more, more preferably 40% or more, and complexes having a coverage ratio of 60% or more or even 80% or more can also be prepared according to the present invention.

The calcium phosphate obtained by the present invention is characterized by a smaller particle size as compared with those obtained by conventional methods using a calcium carbonate and phosphoric acid as starting materials. The calcium phosphate obtained by the conventional methods basically has a particle size of 10 μm or more, e.g., the calcium phosphate described in Comparative example 2 of JPA 2016-69243 has a particle size in the order of 8 μm. The reason why the particle size decreases as compared with those obtained by the conventional methods seems to lie in the small particle size of the calcium carbonate used as a starting material or the high shear applied during the reaction in the presence of the fiber.

One advantage resulting from the calcium phosphate having a small particle size is an increase in the specific surface area of the product. Higher specific surface areas are preferred for use in adsorbents, deodorants and the like because the adsorbent capacity also improves. Another advantage is that calcium phosphates having a smaller particle size more readily adhere to fibers.

The complexes of a calcium phosphate and a fiber according to the present invention can be formed into products in which the calcium phosphate is not only more readily retained but also uniformly dispersed without being aggregated in contrast to simple mixtures of the calcium phosphate and the fiber.

The complexes obtained by the present invention can be modified by known methods. In an embodiment, for example, they can be hydrophobized on their surfaces to enhance the miscibility with resins or the like. For example, the calcium phosphate-fiber complexes of the present invention can contain titanium. Titanium in the form of titanium dioxide or the like is known to have various activities such as photocatalytic activity so that composite particles having various activities can be obtained when such titanium is retained in the complexes. In one embodiment, a different material such as titanium can be incorporated into the complexes by reacting phosphoric acid and a calcium carbonate in the presence of titanium.

The complexes of the present invention can be used to prepare molded products, as appropriate. For example, the complexes obtained by the present invention can be readily formed into sheets having a high ash content. Paper machines (sheet-forming machines) used for preparing sheets include, for example, Fourdrinier machines, cylinder machines, gap formers, hybrid formers, multilayer paper machines, known sheet-forming machines combining the papermaking methods of these machines and the like. The linear pressure in the press section of the paper machines and the linear calendering pressure in a subsequent optional calendering process can be both selected within a range convenient for the runnability and the performance of the complex sheets. Further, the sheets thus formed may be impregnated or coated with starches, various polymers, pigments and mixtures thereof.

During sheet forming, wet and/or dry strength additives (paper strength additives) can be added. This allows the strength of the complex sheets to be improved. Strength additives include, for example, resins such as urea-formaldehyde resins, melamine-formaldehyde resins, polyamides, polyamines, epichlorohydrin resins, vegetable gums, latexes, polyethylene imines, glyoxal, gums, mannogalactan polyethylene imines, polyacrylamide resins, polyvinylamines, and polyvinyl alcohols; composite polymers or copolymers composed of two or more members selected from the resins listed above; starches and processed starches; carboxymethylcellulose, guar gum, urea resins and the like. The amount of the strength additives to be added is not specifically limited.

Further, high molecular weight polymers or inorganic materials can be added to promote the adhesion of fillers to fibers or to improve the retention of fillers or fibers. For example, coagulants can be added, including cationic polymers such as polyethylene imines and modified polyethylene imines containing a tertiary and/or quaternary ammonium group, polyalkylene imines, dicyandiamide polymers, polyamines, polyamine/epichlorohydrin polymers, polymers of dialkyldiallyl quaternary ammonium monomers, dialkylaminoalkyl acrylates, dialkylaminoalkyl methacrylates, dialkylaminoalkyl acrylamides and dialkylaminoalkyl methacrylamides with acrylamides, monoamine/epihalohydrin polymers, polyvinylamines and polymers containing a vinylamine moiety as well as mixtures thereof; cation-rich zwitterionic polymers containing an anionic group such as a carboxyl or sulfone group copolymerized in the molecules of the polymers listed above; mixtures of a cationic polymer and an anionic or zwitterionic polymer and the like. Further, retention aids such as cationic or anionic or zwitterionic polyacrylamide-based materials can be used. These may be applied as retention systems called dual polymers in combination with at least one or more cationic or anionic polymers or may be applied as multicomponent retention systems in combination with at least one or more anionic inorganic microparticles such as bentonite, colloidal silica, polysilicic acid, microgels of polysilicic acid or polysilicic acid salts and aluminum-modified products thereof or one or more organic microparticles having a particle size of 100 μm or less called micropolymers composed of crosslinked/polymerized acrylamides. Especially when the polyacrylamide-based materials used alone or in combination with other materials have a weight-average molecular weight of 2,000,000 Da or more, preferably 5,000,000 Da or more as determined by intrinsic viscosity measurement, good retention can be achieved, and when the acrylamide-based materials have a molecular weight of 10,000,000 Da or more and less than 30,000,000 Da, very high retention can be achieved. The polyacrylamide-based materials may be emulsions or solutions. Specific compositions of such materials are not specifically limited so far as they contain an acrylamide monomer unit as a structural unit therein, but include, for example, copolymers of a quaternary ammonium salt of an acrylate ester and an acrylamide, or ammonium salts obtained by copolymerizing an acrylamide and an acrylate ester and then quaternarizing the copolymer. The cationic charge density of the cationic polyacrylamide-based materials is not specifically limited.

Other additives include freeness improvers, internal sizing agents, pH modifiers, antifoaming agents, pitch control agents, slime control agents, bulking agents, inorganic particles (the so-called fillers) such as calcium carbonate, kaolin, talc and silica and the like depending on the purposes. The amount of these additives to be used is not specifically limited.

Molding techniques other than sheet forming may also be used, and molded products having various shapes can be obtained by the so-called pulp molding process involving casting a raw material into a mold and then dewatering by suction and drying it or the process involving spreading a raw material over the surface of a molded product of a resin or metal or the like and drying it, and then releasing the dried material from the substrate or other processes. Further, the complexes can be molded like plastics by mixing them with resins, or can be molded like ceramics by calcining them with minerals such as silica or alumina. In the compounding/drying/molding steps shown above, only one complex can be used, or a mixture of two or more complexes can be used. Two or more complexes can be used as a premixture of them or can be mixed after they have been individually compounded, dried and molded.

Further, various organic materials such as polymers or various inorganic materials such as pigments may be added later to molded products of the complexes.

The calcium phosphate forming part of the complexes of the present invention has an average primary particle size of 5 μm or less, and may have an average primary particle size of 1 μm or less or 200 nm or less.

Calcium Carbonate-Fiber Complexes

As described above, the calcium phosphate-fiber complexes of the present invention can be prepared by, for example, reacting a calcium carbonate-fiber complex and phosphoric acid.

The calcium carbonate-fiber complex can be prepared efficiently by synthesizing the calcium carbonate in a solution containing the fiber. Especially in preferred embodiments, a complex of a calcium carbonate having a small average particle size and a fiber can be prepared efficiently by synthesizing the calcium carbonate in the presence of cavitation bubbles.

In preferred embodiments, the calcium carbonate microparticles forming part of the complex have an average primary particle size of less than 5 μm, and it is possible to use a calcium carbonate having an average primary particle size of 1 μm or less or 500 nm or less or even 200 nm or less or 100 nm or less. On the other hand, the calcium carbonate microparticles can have an average primary particle size of 10 nm or more.

Further in the present invention, the calcium carbonate may take the form of secondary particles resulting from the aggregation of fine primary particles wherein the secondary particles can be produced to suit the intended purposes via an aging process, or aggregates can be broken down by grinding. Grinding means include ball mills, sand grinder mills, impact mills, high pressure homogenizers, low pressure homogenizers, Dyno mills, ultrasonic mills, Kanda grinders, attritors, millstone type mills, vibration mills, cutter mills, jet mills, breakers, beaters, single screw extruders, twin screw extruders, ultrasonic stirrers, juicers/mixers for home use, etc.

The complexes obtained by the present invention can be used in various shapes including, for example, powders, pellets, moldings, aqueous suspensions, pastes, sheets and other shapes. Further, the complexes can be used as main components to form molded products such as moldings and particles or pellets with other materials. The dryer used to dry the complexes to form powders is not specifically limited either, and air-flow dryers, band dryers, spray dryers and the like can be suitably used, for example.

The complexes obtained by the present invention can be used for various applications and they can be widely used for any applications including, for example, papers, fibers, cellulosic composite materials, filter materials, paints, plastics and other resins, rubbers, elastomers, ceramics, glasses, tires, construction materials (asphalt, asbestos, cement, boards, concrete, bricks, tiles, plywoods, fiber boards and the like), various carriers (catalyst carriers, drug carriers, agrochemical carriers, microbial carriers and the like), adsorbents (decontaminants, deodorants, dehumidifying agents and the like), anti-wrinkle agents, clay, abrasives, modifiers, repairing materials, thermal insulation materials, damp proofing materials, water repellent materials, waterproofing materials, light shielding materials, sealants, shielding materials, insect repellents, adhesives, inks, cosmetics, medical materials, paste materials, filter materials, flame retardant materials, sanitary products (disposable diapers, sanitary napkins, incontinence pads, nursing pads, etc.) and the like. They also can be used for various fillers, coating agents and the like in the applications mentioned above. Among them, they are preferably used for adsorbents (decontaminants, deodorants, dehumidifying agents and the like), filter materials, and sanitary products (disposable diapers, sanitary napkins, incontinence pads, nursing pads).

The complexes of the present invention may also be applied for papermaking purposes including, for example, printing papers, newsprint papers, inkjet printing papers, PPC papers, kraft papers, woodfree papers, coated papers, coated fine papers, wrapping papers, thin papers, colored woodfree papers, cast-coated papers, carbonless copy papers, label papers, heat-sensitive papers, various fancy papers, water-soluble papers, release papers, process papers, hanging base papers, incombustible papers, flame retardant papers, base papers for laminated boards, battery separators, cushion papers, tracing papers, impregnated papers, papers for ODP, building papers, papers for decorative building materials, envelope papers, papers for tapes, heat exchange papers, chemical fiber papers, aseptic papers, water resistant papers, oil resistant papers, heat resistant papers, photocatalytic papers, cosmetic papers (facial blotting papers and the like), various sanitary papers (toilet papers, facial tissues, wipers, diapers, menstrual products and the like), cigarette rolling papers, paperboards (liners, corrugating media, white paperboards and the like), base papers for paper plates, cup papers, baking papers, abrasive papers, synthetic papers and the like. Thus, the present invention makes it possible to provide sheets in which a calcium phosphate is not only more readily retained but also uniformly dispersed without being aggregated in contrast to those in which a calcium phosphate having a small primary particle size is simply added to a fiber. The calcium phosphate here is not only adhered to the outer surface and the inside of the lumen of the fiber but also produced within microfibrils, as shown by the results of electron microscopic observation.

Further, the complexes obtained by the present invention can be used typically in combination with particles known as inorganic fillers and organic fillers or various fibers. For example, inorganic fillers include calcium carbonate (precipitated calcium carbonate, ground calcium carbonate), magnesium carbonate, barium carbonate, aluminum hydroxide, calcium hydroxide, magnesium hydroxide, zinc hydroxide, clay (kaolin, calcined kaolin, delaminated kaolin), talc, zinc oxide, zinc stearate, titanium dioxide, silica products prepared from sodium silicate and a mineral acid (white carbon, silica/calcium carbonate complexes, silica/titanium dioxide complexes), terra alba, bentonite, diatomaceous earth, calcium sulfate, zeolite, inorganic fillers recycled from ash obtained in a deinking process and inorganic fillers consisting of complexes of ash formed with silica or calcium carbonate during recycling, etc. In the calcium carbonate-silica complexes, amorphous silicas such as white carbon may also be used in addition to calcium carbonate and/or precipitated calcium carbonate-silica complexes. Organic fillers include urea-formaldehyde resins, polystyrene resins, phenol resins, hollow microparticles, acrylamide complexes, wood-derived materials (microfibers, microfibrillar fibers, kenaf powders), modified/insolubilized starches, ungelatinized starches and the like. Fibers that can be used include, without limitation, not only natural fibers such as celluloses but also synthetic fibers artificially synthesized from raw materials such as petroleum, regenerated fibers (semisynthetic fibers) such as rayon and lyocell, and even inorganic fibers and the like. In addition to the examples mentioned above, natural fibers include protein fibers such as wool and silk yarns and collagen fibers; complex carbohydrate fibers such as chitin-chitosan fibers and alginate fibers and the like. Examples of cellulosic raw materials include pulp fibers (wood pulps and non-wood pulps), bacterial celluloses, animal-derived celluloses such as Ascidiacea, algae, etc., among which wood pulps may be prepared by pulping wood raw materials. Examples of wood raw materials include softwoods such as *Pinus densiflora, Pinus thunbergii, Abies sachalinensis, Picea jezoensis, Pinus koraiensis, Larix kaempferi, Abies firma, Tsuga sieboldii, Cryptomeria japonica, Chamaecyparis obtusa, Larix kaempferi, Abies veitchii, Picea jezoensis* var. *hondoensis, Thujopsis dolabrata*, Douglas fir (*Pseudotsuga menziesii*), hemlock (*Conium maculatum*), white fir (*Abies concolor*), spruces, balsam fir (*Abies balsamea*), cedars, pines, *Pinus merkusii, Pinus radiata*, and mixed materials thereof; and hardwoods such as *Fagus crenata*, birches, *Alnus japonica*, oaks, *Machilus thunbergii, Castanopsis, Betula platyphylla, Populus nigra* var. *italica*, poplars, *Fraxinus, Populus maximowiczii, Eucalyptus*, mangroves, *Meranti, Acacia* and mixed materials thereof. The technique for pulping the wood raw materials is not specifically limited, and examples include pulping processes commonly used in the papermaking industry. Wood pulps can be classified by the pulping process and include, for example, chemical pulp obtained by digestion via the kraft process, sulfite process, soda process, polysulfide process or the like; mechanical pulp obtained by pulping with a mechanical force such as a refiner, grinder or the like; semichemical pulp obtained by pulping with a mechanical force after a chemical pretreatment; waste paper pulp; deinked pulp and the like. The wood pulps may have been unbleached (before bleaching) or bleached (after bleaching). Examples of non-wood pulps include cotton, hemp, sisal (*Agave sisalana*), abaca (*Musa textilis*), flax, straw, bamboo, bagas, kenaf, sugar cane, corn, rice straw, *Broussonetia kazinoki×B. papyrifera, Edgeworthia chrysantha* and the like. The wood pulps and non-wood pulps may be unbeaten or beaten. Synthetic fibers include polyesters, polyamides, polyolefins, and acrylic fibers; semisynthetic fibers include rayon, acetate and the like; and inorganic fibers include glass fiber, carbon fiber, various metal fibers and the like. All these may be used alone or as a combination of two or more of them.

The average particle size or shape or the like of the calcium phosphate forming part of the complexes of the present invention can be identified by electron microscopic observation. Further, microparticles having various sizes or shapes can be complexed with a fiber by controlling the conditions under which the calcium carbonate or calcium phosphate is synthesized.

Cavitation Bubbles

In one embodiment of the processes for preparing the complexes of the present invention, a calcium carbonate and/or calcium phosphate can be synthesized in the presence of cavitation bubbles. As used herein, the term "cavitation" refers to a physical phenomenon in which bubbles are generated and disappear in the flow of a fluid in a short time due to a pressure difference. The bubbles generated by cavitation (cavitation bubbles) develop from very small "bubble nuclei" of 100 μm or less present in a liquid when the pressure drops below the saturated vapor pressure in the fluid only for a very short time.

In the present invention, the reaction may be performed under conditions where cavitation bubbles are present in a reaction vessel or the reaction may be performed under conditions where cavitation bubbles are not generated. In either case, the reaction vessel is preferably a pressure vessel that can be kept in a closed state, but an open reaction vessel may also be used without any inconvenience. It should be noted that the pressure vessel in the present invention refers to a vessel that can withstand a pressure of 0.005 MPa or more. Under conditions where cavitation bubbles are not generated, the pressure in the pressure vessel is preferably 0.005 MPa or more and 0.9 MPa or less expressed in static pressure.

In the present invention, cavitation bubbles can be generated in a reaction vessel by known methods. For example, it is possible to generate cavitation bubbles by injecting a fluid under high pressure, or by stirring at high speed in a fluid, or by causing an explosion in a fluid, or by using an ultrasonic vibrator (vibratory cavitation) or the like.

Particularly in the present invention, cavitation bubbles are preferably generated by injecting a fluid under high pressure because the cavitation bubbles are readily generated and controlled. In this embodiment, a liquid to be injected is compressed by using a pump or the like and injected at high speed through a nozzle or the like, whereby cavitation bubbles are generated simultaneously with the expansion of the liquid itself due to a very high shear force and a sudden pressure drop near the nozzle. Fluid jetting allows cavitation bubbles to be generated with high efficiency, whereby the cavitation bubbles have stronger collapse impact. In the present invention, a calcium carbonate and/or calcium phosphate is synthesized in the presence of controlled cavitation bubbles, clearly in contrast to the cavitation bubbles spontaneously occurring in fluid machinery and causing uncontrollable risks.

In the present invention, the reaction solution of a raw material or the like can be directly used as a jet liquid to generate cavitation, or some fluid can be injected into the reaction vessel to generate cavitation bubbles. The fluid forming a liquid jet may be any of a liquid or a gas or a solid such as a powder or pulp or a mixture thereof so far as it is in a flowing state. Moreover, another fluid such as carbonic acid gas can be added as an additional fluid to the fluid described above, if desired. The fluid described above and the additional fluid may be injected as a homogeneous mixture or may be injected separately.

The liquid jet refers to a jet of a liquid or a fluid containing solid particles or a gas dispersed or mixed in a liquid, such as a liquid jet containing a slurry of a pulp or inorganic particles and bubbles. The gas here may contain bubbles generated by cavitation.

The flow rate and pressure are especially important for cavitation because it occurs when a liquid is accelerated and a local pressure drops below the vapor pressure of the liquid. Therefore, the cavitation number $\sigma$, which is a basic dimensionless number expressing a cavitation state, is defined by equation 1 below ("New Edition Cavitation: Basics and Recent Advance", Written and Edited by Yoji Katoh, Published by Makishoten, 1999).

[Formula 1]

$$\sigma = \frac{p_\infty - p_v}{\frac{1}{2}\rho U_m^2} \quad (1)$$

If the cavitation number here is high, it means that the flow site is in a state where cavitation is less likely to occur. Especially when cavitation is generated through a nozzle or an orifice tube as in the case of a cavitation jet, the cavitation number $\sigma$ can be rewritten by equation (2) below where $p_1$ is the nozzle upstream pressure, $p_2$ is the nozzle downstream pressure, and $p_v$ is the saturated vapor pressure of sample water, and the cavitation number $\sigma$ can be further approximated as shown by equation (2) below because the pressure difference between $p_1$, $p_2$ and $p_v$ is significant in a cavitation jet so that $p_1 \gg p_2 \gg p_v$ (H. Soyama, J. Soc. Mat. Sci. Japan, 47 (4), 381 1998).

[Formula 2]

$$\sigma = \frac{p_2 - p_v}{p_1 - p_2} \cong \frac{p_2}{p_1} \quad (2)$$

Cavitation conditions in the present invention are as follow: the cavitation number $\sigma$ defined above is desirably 0.001 or more and 0.5 or less, preferably 0.003 or more and 0.2 or less, especially preferably 0.01 or more and 0.1 or less. If the cavitation number $\sigma$ is less than 0.001, little benefit is attained because the pressure difference from the surroundings is small when cavitation bubbles collapse, but if it is greater than 0.5, the pressure difference in the flow is too small to generate cavitation.

When cavitation is generated by emitting a jetting liquid through a nozzle or an orifice tube, the pressure of the jetting liquid (upstream pressure) is desirably 0.01 MPa or more and 30 MPa or less, preferably 0.7 MPa or more and 20 MPa or less, more preferably 2 MPa or more and 15 MPa or less. If the upstream pressure is less than 0.01 MPa, little benefit is attained because a pressure difference is less likely to occur from the downstream pressure. If the upstream pressure is higher than 30 MPa, a special pump and pressure vessel are required and energy consumption increases, leading to cost disadvantages. On the other hand, the pressure in the vessel (downstream pressure) is preferably 0.05 MPa or more and 0.9 MPa or less expressed in static pressure. Further, the ratio between the pressure in the vessel and the pressure of the jetting liquid is preferably in the range of 0.001 to 0.5.

The jet flow rate of the jetting liquid is desirably in the range of 1 msec or more and 200 msec or less, preferably in the range of 20 msec or more and 100 msec or less. If the jet flow rate is less than 1 msec, little benefit is attained because the pressure drop is too small to generate cavitation. If it is greater than 200 m/sec, however, special equipment is required to generate high pressure, leading to cost disadvantages.

In the present invention, cavitation may be generated in a reaction vessel where a calcium carbonate and/or calcium phosphate is synthesized. The process can be run in one pass, or can be run through a necessary number of cycles. Further, the process can be run in parallel or in series using multiple generating means.

Liquid injection for generating cavitation may take place in a vessel open to the atmosphere, but preferably within a pressure vessel to control cavitation.

When cavitation is generated by liquid injection, the solids content of the aqueous suspension of slaked lime forming the reaction solution is preferably 30% by weight or less, more preferably 20% by weight or less. This is because cavitation bubbles are more likely to homogeneously act on the reaction system at such levels. Further, the solids content of the aqueous suspension of slaked lime forming the reaction solution is preferably 0.1% by weight or more in terms of the reaction efficiency.

In the present invention, the pH of the reaction solution is basic at the beginning of the reaction, but changes to neutral as the carbonation reaction proceeds. Thus, the reaction can be controlled by monitoring the pH of the reaction solution.

In the present invention, stronger cavitation can be generated by increasing the jetting pressure of the liquid because the flow rate of the jetting liquid increases and accordingly the pressure decreases. Moreover, the impact force can be stronger by increasing the pressure in the reaction vessel because the pressure in the region where cavitation bubbles collapse increases and the pressure difference between the bubbles and the surroundings increases so that the bubbles vigorously collapse. This also helps to promote the dissolution and dispersion of the carbonic acid gas introduced. The reaction temperature is preferably 0° C. or more and 90° C. or less, especially preferably 10° C. or more and 60° C. or less. Given that the impact force is generally thought to be maximal at the midpoint between the melting point and the boiling point, the temperature is suitably around 50° C. in cases of aqueous solutions, though significant benefits can be obtained even at lower temperatures within the ranges defined above because there is no influence of vapor pressure.

In the the present invention, the energy required for generating cavitation can be reduced by adding a surfactant. Surfactants that may be used include known or novel surfactants, e.g., nonionic surfactants, anionic surfactants, cationic surfactants and amphoteric surfactants such as fatty acid salts, higher alkyl sulfates, alkyl benzene sulfonates, higher alcohols, alkyl phenols, alkylene oxide adducts of fatty acids and the like. These may be used alone or as a mixture of two or more components. They may be added in any amount necessary for lowering the surface tension of the jetting liquid and/or target liquid.

Synthesis of Complexes of Microparticles and a Fiber

In one embodiment of the present invention wherein a calcium carbonate is synthesized in a solution containing a fiber, the calcium carbonate can be synthesized by a known method. For example, the calcium carbonate can be synthesized by the carbonation process, soluble salt reaction, lime-soda process, soda process or the like, and in a preferred embodiment, the calcium carbonate is synthesized by the carbonation process.

Typically, the preparation of a calcium carbonate by the carbonation process uses lime as a calcium source to synthesize the calcium carbonate via a slaking step in which water is added to quick lime CaO to give slaked lime $Ca(OH)_2$ and a carbonation step in which carbonic acid gas $CO_2$ is injected into the slaked lime to give the calcium carbonate $CaCO_3$. During then, the suspension of slaked lime prepared by adding water to quick lime may be passed through a screen to remove less soluble lime particles contained in the suspension. Alternatively, slaked lime may be used directly as a calcium source. In cases where a calcium carbonate is synthesized by the carbonation process in the present invention, the carbonation reaction may be performed by injecting carbonic acid gas into a reaction system.

Typically known reactors for preparing a calcium carbonate by the carbonation process (carbonation reactors: carbonators) include gas injection carbonators and mechanically stirred carbonators. The gas injection carbonators inject carbonic acid gas into a carbonation reactor containing a suspension of slaked lime (milk of lime) to react the slaked lime with the carbonic acid gas, but it is difficult to uniformly and precisely control the size of bubbles simply by injecting carbonic acid gas, which imposes limitations in terms of the reaction efficiency. On the other hand, the mechanically stirred carbonators are equipped with a stirrer inside the carbonators and introduce carbonic acid gas near the stirrer, thereby dispersing the carbonic acid gas as fine bubbles to improve the efficiency of the reaction between the slaked lime and the carbonic acid gas ("Handbook of Cement, Gypsum and Lime" published by GIHODO SHUPPAN Co., Ltd., 1995, page 495).

If the reaction solution had a high concentration or the carbonation reaction proceeded in cases where stirring took place with a stirrer provided within a carbonation reactor as in mechanically stirred carbonators, however, the resistance of the reaction solution increased to make it difficult to sufficiently stir it and therefore make it difficult to exactly control the carbonation reaction or the stirrer is subjected to a considerable load for sufficient stirring, thus leading to energy disadvantages. Further, a gas injection port is located at a lower site of the carbonator, and blades of the stirrer are provided near the bottom of the carbonator to allow better stirring. Less soluble lime screen residues rapidly precipitate and always stay at the bottom, thereby blocking the gas injection port or disturbing the balance of the stirrer. Moreover, conventional methods required not only a carbonator but also a stirrer and equipment for introducing carbonic acid gas into the carbonator, which also incurred much costs of equipment. In the mechanically stirred carbonators, carbonic acid gas supplied near a stirrer are dispersed as fine bubbles by the stirrer to improve the efficiency of the reaction between the slaked lime and the carbonic acid gas, but the carbonic acid gas could not be dispersed as sufficiently fine bubbles if the concentration of the reaction solution was high or in other cases and it was also sometimes difficult to precisely control the morphology or the like of the produced calcium carbonate in the carbonation reaction. In preferred embodiments of the present invention, a calcium carbonate is synthesized in the presence of cavitation bubbles, whereby the carbonation reaction proceeds efficiently and uniform calcium carbonate microparticles can be prepared. Especially, the use of a jet cavitation allows sufficient stirring without any mechanical stirrer such as blades. In the present invention, previously known reactors can be used, including the gas injection carbonators and the mechanically stirred carbonators as described above without any inconveniences as a matter of course, and these reactors may be combined with a jet cavitation using a nozzle or the like.

When a calcium carbonate is synthesized by the carbonation process, the aqueous suspension of slaked lime preferably has a solids content of 0.1 to 40% by weight, more preferably 0.5 to 30% by weight, still more preferably in the order of 1 to 20% by weight. If the solids content is low, the reaction efficiency decreases and the production cost increases, but if the solids content is too high, the flowability decreases and the reaction efficiency decreases. In preferred embodiments of the present invention, a calcium carbonate is synthesized in the presence of cavitation bubbles so that the reaction solution and carbonic acid gas can be mixed well even if a suspension (slurry) having a high solids content is used.

The aqueous suspension containing slaked lime that can be used includes those commonly used for the synthesis of calcium carbonate, and can be prepared by, for example, mixing slaked lime with water or by slaking (digesting) quick lime (calcium oxide) with water. The slaking conditions include, but not specifically limited to, a CaO concentration of 0.1% by weight or more, preferably 1% by weight or more, and a temperature of 20 to 100° C., preferably 30 to 100° C., for example. Further, the average residence time in the slaking reactor (slaker) is not specifically limited either, but can be, for example, 5 minutes to 5 hours, preferably 2 hours or less. It should be understood that the slaker may be batch or continuous. It should be noted that the carbonation reactor (carbonator) and the slaking reactor (slaker) may be provided separately, or one reactor may serve as both carbonation reactor and slaking reactor in the present invention.

The present invention uses water for preparing the suspension or for other purposes, including common tap water, industrial water, groundwater, well water and the like, and also can conveniently use ion-exchanged water, distilled water, ultrapure water, industrial waste water, and the water resulting from the separation/dehydration of the calcium carbonate slurry obtained in the carbonation step.

Further in the present invention, the reaction solution can be circulated from the carbonation reactor and used as a liquid containing calcium hydroxide. If the reaction solution is circulated in this way to increase contacts between the reaction solution and carbonic acid gas, the reaction efficiency increases and a desired calcium carbonate can be easily obtained.

In the present invention, a gas containing carbon dioxide (carbonic acid gas) is injected into a reaction vessel where it is mixed with the reaction solution. According to the present invention, carbonic acid gas can be supplied to the reaction solution without any gas feeder such as a fan, blower or the like. Especially when cavitation bubbles are used, the carbonation reaction can be performed with good efficiency because the carbonic acid gas is finely dispersed by the cavitation bubbles.

In the present invention, the carbon dioxide concentration of the gas containing carbon dioxide is not specifically limited, but the carbon dioxide concentration is preferably higher. Further, the amount of carbonic acid gas introduced into the reaction vessel is not limited and can be selected as appropriate, but carbonic acid gas is preferably used at a flow rate of 100 to 10000 L/hr per kg of slaked lime, for example.

The gas containing carbon dioxide of the present invention may be substantially pure carbon dioxide gas or a mixture with another gas. For example, a gas containing an inert gas such as air or nitrogen in addition to carbon dioxide gas can be used as the gas containing carbon dioxide. Further, gases containing carbon dioxide other than carbon dioxide gas (carbonic acid gas) that can be conveniently used include exhaust gases discharged from incinerators, coal-fired boilers, heavy oil-fired boilers and the like in papermaking factories. In addition, the carbonation reaction can also be performed using carbon dioxide generated from the lime calcination process.

For preparing the complexes of the present invention, various known auxiliaries can also be added. For example, chelating agents can be added in the carbonation reaction, specifically including polyhydroxycarboxylic acids such as citric acid, malic acid, and tartaric acid; dicarboxylic acids such as oxalic acid; sugar acids such as gluconic acid; aminopolycarboxylic acids such as iminodiacetic acid and ethylenediamine tetraacetic acid and alkali metal salts thereof; alkali metal salts of polyphosphoric acids such as hexametaphosphoric acid and tripolyphosphoric acid; amino acids such as glutamic acid and aspartic acid and alkali metal salts thereof; ketones such as acetylacetone, methyl acetoacetate and allyl acetoacetate; sugars such as sucrose; and polyols such as sorbitol. Surface-treating agents can also be added, including saturated fatty acids such as palmitic acid and stearic acid; unsaturated fatty acids such as oleic acid and linoleic acid; alicyclic carboxylic acids; resin acids such as abietic acid; as well as salts, esters and ethers thereof; alcoholic activators, sorbitan fatty acid esters, amide- or amine-based surfactants, polyoxyalkylene alkyl ethers, polyoxyethylene nonyl phenyl ether, sodium alpha-olefin sulfonate, long-chain alkylamino acids, amine oxides, alkylamines, quaternary ammonium salts, aminocarboxylic acids, phosphonic acids, polycarboxylic acids, condensed phosphoric acids and the like. Further, dispersants can also be used, if desired. Such dispersant include, for example, sodium polyacrylate, sucrose fatty acid esters, glycerol esters of fatty acids, ammonium salts of acrylic acid-maleic acid copolymers, methacrylic acid-naphthoxypolyethylene glycol acrylate copolymers, ammonium salts of methacrylic acid-polyethylene glycol monomethacrylate copolymers, polyethylene glycol monoacrylate and the like. These can be used alone or as a combination of two or more of them. They may be added before or after the carbonation reaction. Such additives can be added preferably in an amount of 0.001 to 20%, more preferably 0.1 to 10% of slaked lime.

Fibers

In the present invention, a calcium phosphate is complexed with a fiber. The fiber forming part of the complexes is not specifically limited, and examples of fibers that can be used include, without limitation, not only natural fibers such as celluloses but also synthetic fibers artificially synthesized from raw materials such as petroleum, regenerated fibers (semisynthetic fibers) such as rayon and lyocell, and even inorganic fibers and the like. In addition to the examples mentioned above, natural fibers include protein fibers such as wool and silk yarns and collagen fibers; complex carbohydrate fibers such as chitin-chitosan fibers and alginate fibers and the like. Examples of cellulosic raw materials include pulp fibers (wood pulps and non-wood pulps), bacterial celluloses, animal-derived celluloses such as Ascidiacea, algae, etc., among which wood pulps may be prepared by pulping wood raw materials. Examples of wood raw materials include softwoods such as *Pinus densiflora, Pinus thunbergii, Abies sachalinensis, Picea jezoensis, Pinus koraiensis, Larix kaempferi, Abies firma, Tsuga sieboldii, Cryptomeria japonica, Chamaecyparis obtusa, Larix kaempferi, Abies veitchii, Picea jezoensis* var. *hondoensis,*

*Thujopsis dolabrata*, Douglas fir (*Pseudotsuga menziesii*), hemlock (*Conium maculatum*), white fir (*Abies concolor*), spruces, balsam fir (*Abies balsamea*), cedars, pines, *Pinus merkusii*, *Pinus radiata*, and mixed materials thereof; and hardwoods such as *Fagus crenata*, birches, *Alnus japonica*, oaks, *Machilus thunbergii*, *Castanopsis*, *Betula platyphylla*, *Populus nigra* var. *italica*, poplars, *Fraxinus*, *Populus maximowiczii*, *Eucalyptus*, mangroves, *Meranti*, *Acacia* and mixed materials thereof.

The technique for pulping the wood raw materials is not specifically limited, and examples include pulping processes commonly used in the papermaking industry. Wood pulps can be classified by the pulping process and include, for example, chemical pulp obtained by digestion via the kraft process, sulfite process, soda process, polysulfide process or the like; mechanical pulp obtained by pulping with a mechanical force such as a refiner, grinder or the like; semichemical pulp obtained by pulping with a mechanical force after a chemical pretreatment; waste paper pulp; deinked pulp and the like. The wood pulps may have been unbleached (before bleaching) or bleached (after bleaching).

Examples of non-wood pulps include cotton, hemp, sisal (*Agave sisalana*), abaca (*Musa textilis*), flax, straw, bamboo, bagas, kenaf, sugar cane, corn, rice straw, *Broussonetia kazinoki×B. papyrifera*, *Edgeworthia chrysantha* and the like.

The pulp fibers may be unbeaten or beaten, and may be chosen depending on the properties of the complex sheets, but they are preferably beaten. This can be expected to improve the sheet strength and to promote the adhesion of calcium carbonate.

Synthetic fibers include polyesters, polyamides, polyolefins, and acrylic fibers; semisynthetic fibers include rayon, acetate and the like; and inorganic fibers include glass fiber, carbon fiber, various metal fibers and the like.

Moreover, these cellulosic raw materials can be further treated so that they can also be used as powdered celluloses, chemically modified celluloses such as oxidized celluloses, and cellulose nanofibers (CNFs) (microfibrillated celluloses (MFCs), TEMPO-oxidized CNFs, phosphate esters of CNFs, carboxymethylated CNFs, mechanically ground CNFs and the like). Powdered celluloses used in the present invention may be, for example, rod-like crystalline cellulose powders having a certain particle size distribution prepared by purifying/drying and grinding/sieving the undecomposed residue obtained after acid hydrolysis of a cleaned pulp, or may be commercially available products such as KC FLOCK (from Nippon Paper Industries Co., Ltd.), CEOLUS (from Asahi Kasei Chemicals Corp.), AVICEL (from FMC Corporation) and the like. The degree of polymerization of celluloses in the powdered celluloses is preferably in the order of 100 to 1500, and the powdered celluloses preferably have a crystallinity of 70 to 90% as determined by X-ray diffraction and also preferably have a volume average particle size of 1 μm or more and 100 μm or less as determined by a laser diffraction particle size distribution analyzer. Oxidized celluloses used in the present invention can be obtained by oxidation with an oxidizing agent in water in the presence of an N-oxyl compound and a compound selected from the group consisting of a bromide, an iodide or a mixture thereof, for example. Cellulose nanofibers can be obtained by disintegrating the cellulosic raw materials described above. Disintegration methods that can be used include, for example, mechanically grinding or beating an aqueous suspension or the like of a cellulose or a chemically modified cellulose such as an oxidized cellulose using a refiner, high pressure homogenizer, grinder, single screw or multi-screw kneader, bead mill or the like. Cellulose nanofibers may be prepared by using one or a combination of the methods described above. The fiber diameter of the cellulose nanofibers thus prepared can be determined by electron microscopic observation or the like and falls within the range of, for example, 5 nm to 1000 nm, preferably 5 nm to 500 nm, more preferably 5 nm to 300 nm. During the preparation of the cellulose nanofibers, a given compound can be further added before and/or after the celluloses are disintegrated and/or micronized, whereby it reacts with the cellulose nanofibers to functionalize the hydroxyl groups. Functional groups used for the functionalization include acyl groups such as acetyl, ester, ether, ketone, formyl, benzoyl, acetal, hemiacetal, oxime, isonitrile, allene, thiol, urea, cyano, nitro, azo, aryl, aralkyl, amino, amide, imide, acryloyl, methacryloyl, propionyl, propioloyl, butyryl, 2-butyryl, pentanoyl, hexanoyl, heptanoyl, octanoyl, nonanoyl, decanoyl, undecanoyl, dodecanoyl, myristoyl, palmitoyl, stearoyl, pivaloyl, benzoyl, naphthoyl, nicotinoyl, isonicotinoyl, furoyl and cinnamoyl; isocyanate groups such as 2-methacryloyloxtyethyl isocyanoyl; alkyl groups such as methyl, ethyl, propyl, 2-propyl, butyl, 2-butyl, tert-butyl, pentyl, hexyl, heptyl, octyl, nonyl, decyl, undecyl, dodecyl, myristyl, palmityl, and stearyl; oxirane, oxetane, oxyl, thiirane, thietane and the like. Hydrogens in these substituents may be substituted by a functional group such as hydroxyl or carboxyl. Further, the alkyl groups may be partially unsaturated with an unsaturated bond. Compounds used for introducing these functional groups are not specifically limited and include, for example, compounds containing phosphate-derived groups, compounds containing carboxylate-derived groups, compounds containing sulfate-derived groups, compounds containing sulfonate-derived groups, compounds containing alkyl groups, compounds containing amine-derived groups and the like. Phosphate-containing compounds include, but not specifically limited to, phosphoric acid and lithium salts of phosphoric acid such as lithium dihydrogen phosphate, dilithium hydrogen phosphate, trilithium phosphate, lithium pyrophosphate, and lithium polyphosphate.

Other examples include sodium salts of phosphoric acid such as sodium dihydrogen phosphate, disodium hydrogen phosphate, trisodium phosphate, sodium pyrophosphate, and sodium polyphosphate. Further examples include potassium salts of phosphoric acid such as potassium dihydrogen phosphate, dipotassium hydrogen phosphate, tripotassium phosphate, potassium pyrophosphate, and potassium polyphosphate. Still further examples include ammonium salts of phosphoric acid such as ammonium dihydrogen phosphate, diammonium hydrogen phosphate, triammonium phosphate, ammonium pyrophosphate, ammonium polyphosphate and the like. Among them, preferred ones include, but not specifically limited to, phosphoric acid, sodium salts of phosphoric acid, potassium salts of phosphoric acid, and ammonium salts of phosphoric acid, and more preferred are sodium dihydrogen phosphate and disodium hydrogen phosphate because they allow phosphate groups to be introduced with high efficiency so that they are convenient for industrial applications. Carboxyl-containing compounds include, but not specifically limited to, dicarboxylic compounds such as maleic acid, succinic acid, phthalic acid, fumaric acid, glutaric acid, adipic acid, and itaconic acid; and tricarboxylic compounds such as citric acid, and aconitic acid. Acid anhydrides of carboxyl-containing compounds include, but not specifically limited to, acid anhydrides of dicarboxylic compounds such as maleic anhydride, succinic anhydride, phthalic anhydride, glutaric anhydride, adipic anhydride, and itaconic anhydride. Derivatives of carboxyl-containing compounds include, but not specifically limited to, imides of acid anhydrides of carboxyl-containing compounds, and derivatives of acid anhydrides of carboxyl-containing compounds. Imides of acid anhydrides of carboxyl-containing compounds include, but not specifically limited to, imides of dicarboxylic compounds such as maleimide, succinimide, and phthalimide. Derivatives of acid anhydrides of carboxyl-containing compounds are not specifically limited. For example, they include acid anhydrides of carboxyl-containing compounds in which hydrogen atoms are at least partially substituted by a substituent (e.g., alkyl, phenyl or the like) such as dimethylmaleic anhydride, diethylmaleic anhydride, and diphenylmaleic anhydride. Among the compounds containing carboxylate-derived groups listed above, preferred ones include, but not specifically limited to, maleic anhydride, succinic anhydride and phthalic anhydride because they are convenient for industrial applications and can be readily gasified. Further, these compounds may be physically adsorbed rather than chemically bonded to the cellulose nanofibers to functionalize the cellulose nanofibers. Physically adsorbed compounds include surfactants, which may be anionic, cationic, or nonionic. When celluloses are functionalized as described above before they are disintegrated and/or ground, these functional groups can be removed, giving back the original hydroxyl groups after they are disintegrated and/or ground. The functionalization as described above can promote disintegration into cellulose nanofibers or help cellulose nanofibers to be mixed with various materials during use.

The fibers shown above may be used alone or as a mixture of two or more of them. Especially, the complexes preferably comprise a wood pulp or a combination of a wood pulp and a non-wood pulp and/or a synthetic fiber, more preferably a wood pulp alone.

In preferred embodiments, the fiber forming part of the complexes of the present invention is a pulp fiber. Alternatively, fibrous materials collected from waste water of papermaking factories may be supplied to the carbonation reaction of the present invention, for example. Various composite particles including those of various shapes such as fibrous particles can be synthesized by supplying such materials to the reaction vessel.

In the present invention, materials that are not directly involved in the carbonation reaction but incorporated into the product calcium carbonate to form composite particles can be used in addition to a fiber. In the present invention, composite particles incorporating inorganic particles, organic particles, polymers or the like in addition to a fiber such as a pulp fiber can be prepared by synthesizing a calcium carbonate in a solution further containing these materials.

Reaction Conditions

In the present invention, the conditions of the carbonation reaction are not specifically limited, and appropriately selected depending on the purposes. For example, the temperature of the carbonation reaction can be 0 to 90° C., preferably 10 to 70° C. The reaction temperature can be controlled by regulating the temperature of the reaction solution using a temperature controller, and if the temperature is low, the reaction efficiency decreases and the cost increases, but if it exceeds 90° C., coarse calcium carbonate particles tend to increase.

Further in the present invention, the carbonation reaction can be a batch reaction or a continuous reaction. Typically, the reaction is preferably performed as a batch process because of the convenience in removing residues after the carbonation reaction. The scale of the reaction is not specifically limited, and can be 100 L or less, or more than 100 L. The volume of the reaction vessel can be, for example, in the order of 10 L to 100 L, or may be in the order of 100 L to 1000 L.

Further, the carbonation reaction can be controlled by monitoring the pH of the reaction suspension, and the carbonation reaction can be performed until the pH reaches, for example, less than pH 9, preferably less than pH 8, more preferably around pH 7 depending on the pH profile of the reaction suspension.

Alternatively, the carbonation reaction can be controlled by monitoring the conductivity of the reaction solution. The carbonation reaction is preferably performed until the conductivity drops to 1 mS/cm or less.

Furthermore, the carbonation reaction can also be controlled by the reaction period, and specifically it can be controlled by adjusting the period during which the reactants stay in the reaction vessel. Additionally, the reaction can also be controlled in the present invention by stirring the reaction solution in the carbonation reactor or performing the carbonation reaction as a multistage reaction.

In the present invention, a calcium phosphate having a desired shape or size can be synthesized by changing phosphation reaction conditions including the reaction temperature of the system, the feeding period of phosphoric acid, the proportion of phosphoric acid added, stirring conditions, the continued stirring (aging) period after mixing both components, the concentration of the reaction system and the like. The reaction temperature is preferably in the range of 20 to 80° C., more preferably 30 to 60° C.

Typically, phosphoric acid is fed into an aqueous slurry of calcium carbonate preferably over 10 to 60 minutes or more rather than feeding it all at once. If it is fed all at once, the resulting particles tend to aggregate or contain deformed pores. Depending on the scale of the reaction and the concentrations of the materials used, it can be added at a rate of 0.01 to 5000 g/min, for example.

The proportion of phosphoric acid added is preferably 10 to 100%, especially preferably 20 to 60% based on the solids content of calcium carbonate.

Stirring conditions desirably include stirring at a strong force of a predetermined level or more. If the stirring force is weak, the resulting particles tend to fail to form a uniformly porous structure throughout them. For example, stirring can be performed at 100 to 5000 rpm.

As for the aging period, both components are desirably aged with stirring for preferably 10 minutes or more, more preferably 30 minutes or more after mixing them.

As for the concentrations during the reaction, the concentration of the suspension of calcium carbonate is preferably 10% by mass or less, more preferably 5% by mass, taking into account the production efficiency. The concentration of phosphoric acid and/or a water-soluble phosphoric acid salt is preferably 40 to 60% by mass.

Water-soluble phosphoric acid salts that can be used include sodium phosphate, disodium hydrogen phosphate, sodium dihydrogen phosphate, potassium phosphate, dipotassium hydrogen phosphate, potassium dihydrogen phosphate, triammonium phosphate, diammonium hydrogen phosphate, ammonium dihydrogen phosphate, and the like.

The calcium phosphate obtained by the present invention is characterized by a smaller particle size as compared with those obtained by conventional methods using a calcium carbonate and phosphoric acid as starting materials, i.e., it has a primary particle size of 5 μm or less, preferably 2.5 μm or less, and even 1 μm or less.

EXAMPLES

The following examples further illustrate the present invention, but the present invention is not limited to these examples. Unless otherwise specified, the concentrations, parts and the like as used herein are based on weight, and the numerical ranges are described to include their endpoints.

Experiment 1: Synthesis of a Complex of Calcium Carbonate Microparticles and a Pulp Fiber An aqueous suspension in an amount of 100 L containing calcium hydroxide (slaked lime $Ca(OH)_2$, 1250 g) and a hardwood bleached kraft pulp (LBKP, Canadian standard freeness CSF: 460 mL, 1250 g) was provided. A 500-L cavitation system was charged with this aqueous suspension and carbonic acid gas was injected into the reaction vessel to synthesize a complex of calcium carbonate microparticles and a fiber by the carbonation process. The reaction temperature was about 25° C., the carbonic acid gas source was a commercially available liquefied gas, the injection flow rate of the carbonic acid gas was 12 L/min, and the reaction was stopped when the pH of the reaction solution reached about 7 (from the pH of about 12.8 before the reaction).

Figure 1:
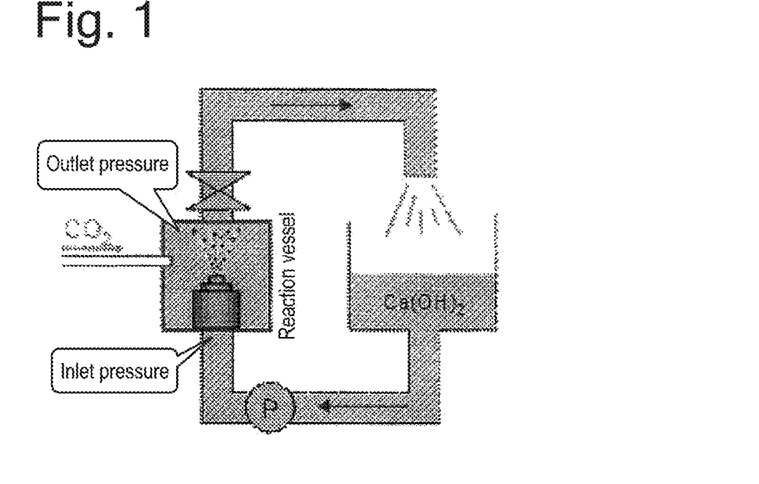
FIG. 1 is a schematic diagram showing the reaction system used in the examples of the present invention.

During the synthesis of the complex, cavitation bubbles were generated in the reaction vessel by injecting the reaction solution into the reaction vessel while circulating it, as shown in FIG. 1. Specifically, cavitation bubbles were generated by injecting the reaction solution through a nozzle (nozzle diameter: 1.5 mm) under high pressure at an injection rate of about 70 m/s, an inlet pressure (upstream pressure) of 7 MPa and an outlet pressure (downstream pressure) of 0.3 MPa.

Figure 2:
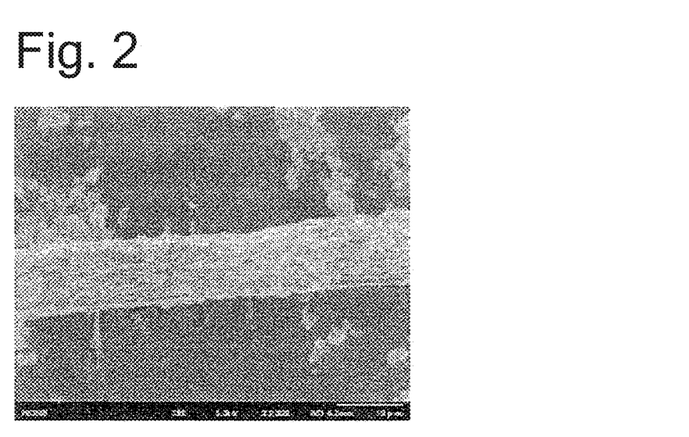
FIG. 2 shows an electron micrograph of the calcium carbonate-fiber complex obtained in Experiment 1 (Sample A) (magnification: 2000×).

Electron microscopic observation of the resulting product (Sample A) showed that a complex had been formed in which a calcium carbonate having a primary particle size of 60 to 90 nm covers the surface of the pulp fiber (FIG. 2). In the complex, the calcium carbonate was observed to spontaneously adhere onto the pulp fiber. The ash content was determined to be 56%. The ash content of the complex here was calculated from the ratio between the weight of ash remaining after the complex was heated at 525° C. for about 2 hours and the original solids content (JIS P 8251: 2003).

Figure 3:
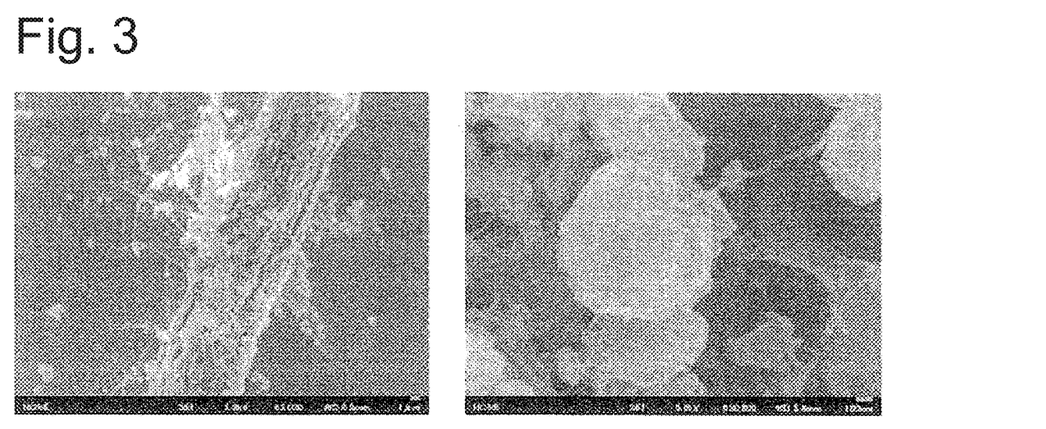
FIG. 3 shows electron micrographs of a calcium phosphate-fiber complex synthesized in Experiment 2 (Sample 1) (magnification: left 3000×, right 50000×).

Experiment 2: Synthesis of Complexes of a Calcium Phosphate and a Pulp Fiber (1) Sample 1 (FIG. 3): Sample A (595 mL, concentration 4.2%) was stirred with phosphoric acid (from Tosoh Corporation, concentration 10%, 57 g) to give a complex of a calcium phosphate and a pulp. Specifically, phosphoric acid was added at a rate of 0.5 g/min using a peristaltic pump into Sample A stirred at 850 rpm using a Three-One Motor agitator in a water bath at 40° C., and after the completion of the dropwise addition, the reaction mixture was aged by further stirring for 30 minutes.

Figure 4:
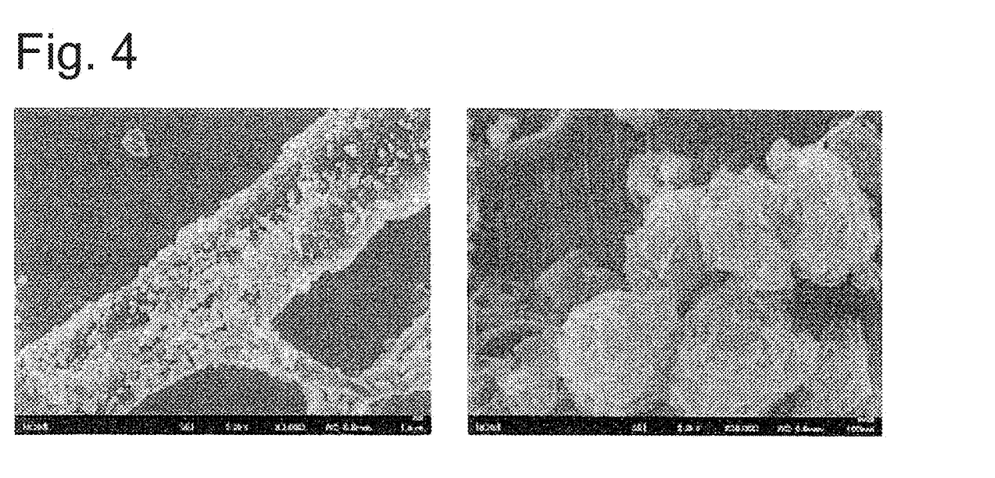
FIG. 4 shows electron micrographs of a calcium phosphate-fiber complex synthesized in Experiment 2 (Sample 2) (magnification: left 10000×, right 50000×).

(2) Sample 2 (FIG. 4): Sample A (595 mL, concentration 4.2%) was stirred with titanium dioxide (SSP-25 from Sakai Chemical Industry Co., Ltd., 1.4 g) and phosphoric acid (from Tosoh Corporation, concentration 10%, 5 7 g) to give a titanium-bearing complex of a calcium phosphate and a pulp. The reaction was performed in the same manner as described for Sample 1 except that titanium dioxide had been added to Sample A in advance.

Figure 5:
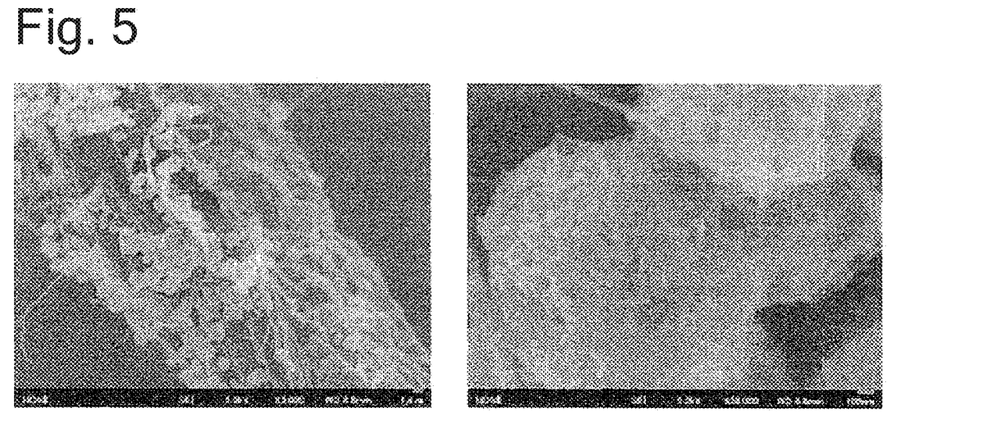
FIG. 5 shows electron micrographs of a calcium phosphate-fiber complex synthesized in Experiment 2 (Sample 3) (magnification: left 10000×, right 50000×).

(3) Sample 3 (FIG. 5): A complex was synthesized in the same manner as described in (1) above except that the concentration of phosphoric acid was 60%, and the amount of phosphoric acid added was 9.5 g.

Figure 6:
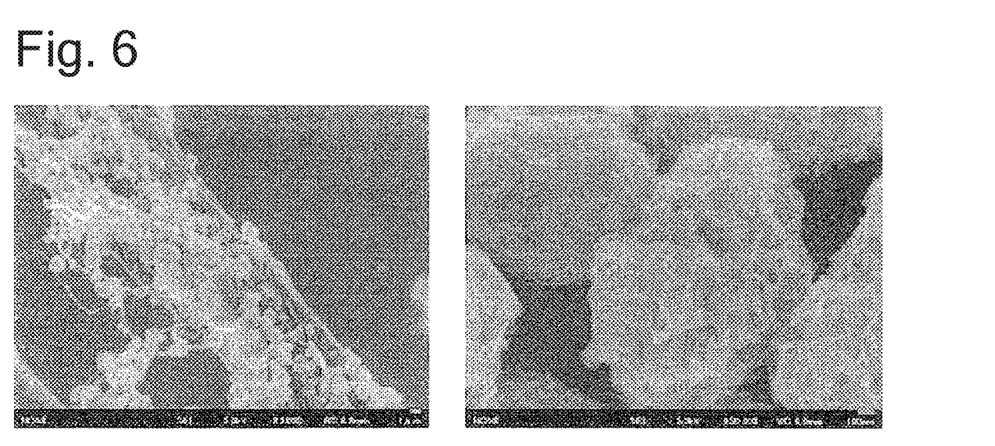
FIG. 6 shows electron micrographs of a calcium phosphate-fiber complex synthesized in Experiment 2 (Sample 4) (magnification: left 10000×, right 50000×).
Figure 7:
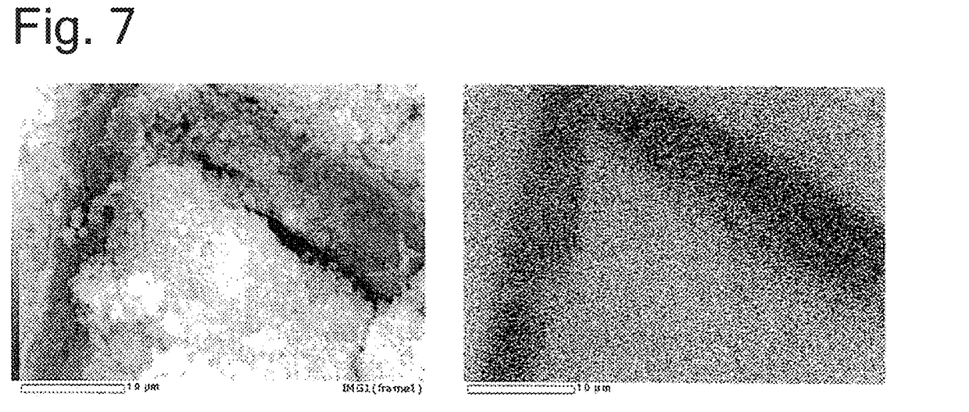
FIG. 7 shows the analytical results of Sheet #1 (with retention aids) in Experiment 3 (magnification: 3000×; right: electron micrograph, left: elemental map).
Figure 8:
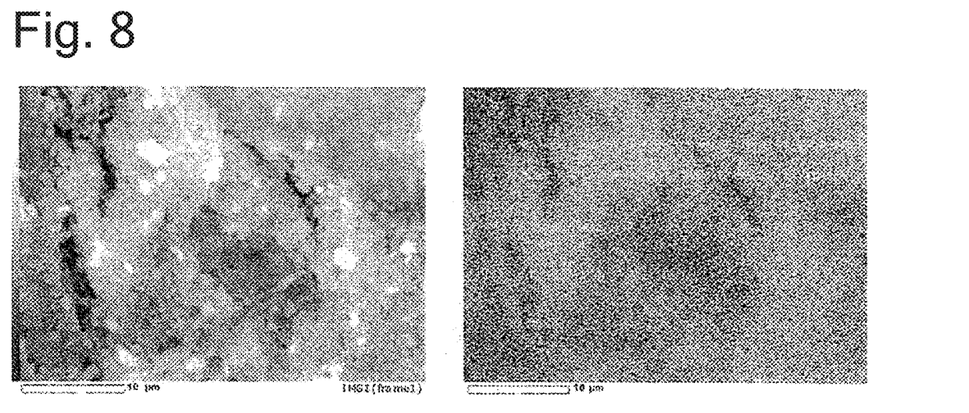
FIG. 8 shows the analytical results of Sheet #2-1 (with retention aids) in Experiment 3 (magnification: 3000×; right: electron micrograph, left: elemental map).
Figure 9:
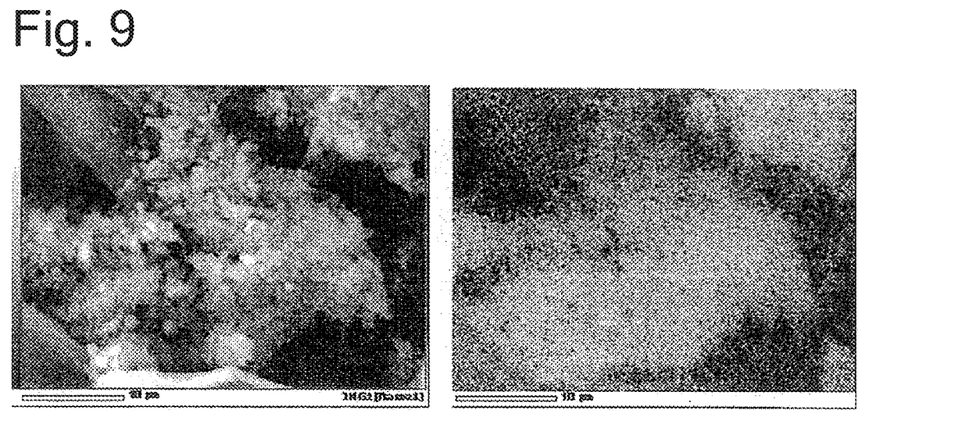
FIG. 9 shows the analytical results of Sheet #2-2 (without retention aids) in Experiment 3 (magnification: 3000×; right: electron micrograph, left: elemental map).
Figure 10:
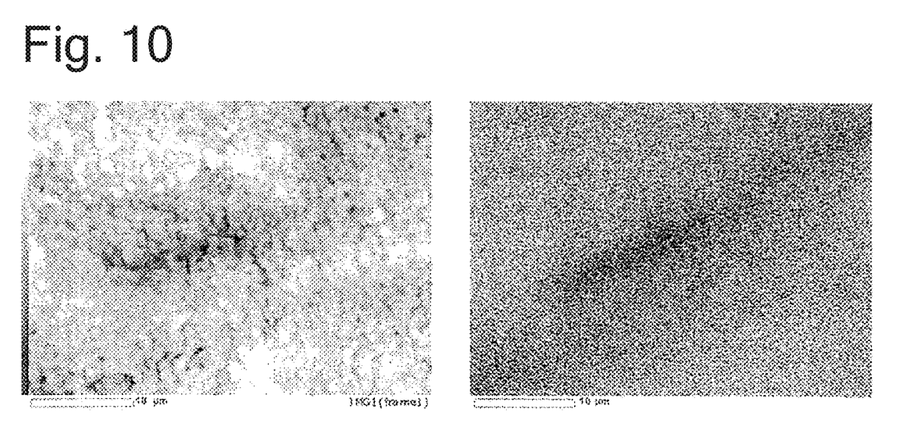
FIG. 10 shows the analytical results of Sheet #3 (with retention aids) in Experiment 3 (magnification: 3000×; right: electron micrograph, left: elemental map).
Figure 11:
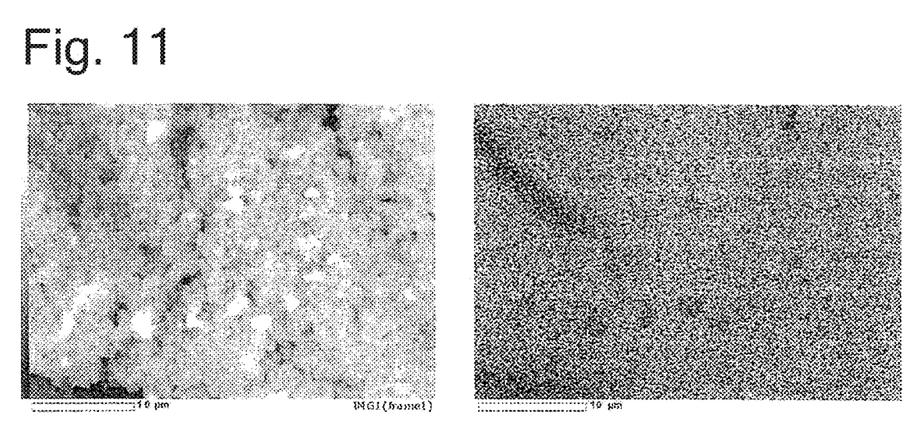
FIG. 11 shows the analytical results of Sheet #4-1 (with retention aids) in Experiment 3 (magnification: 3000×; right: electron micrograph, left: elemental map).
Figure 12:
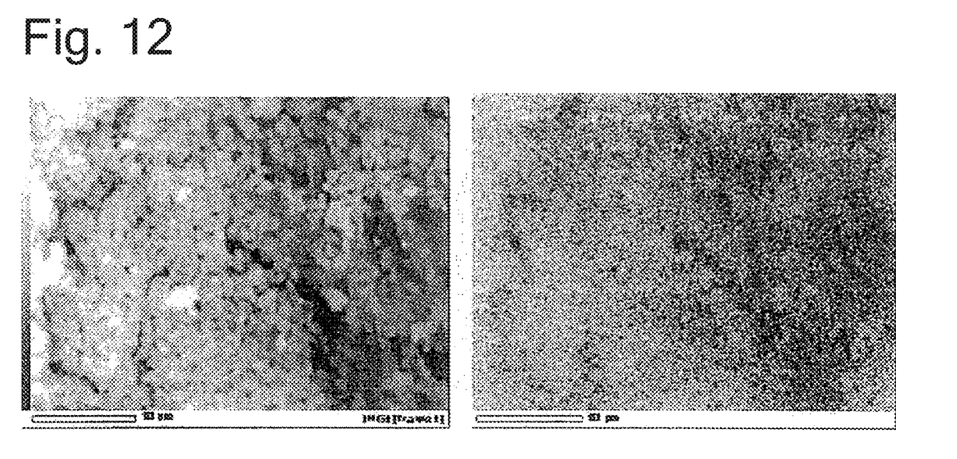
FIG. 12 shows the analytical results of Sheet #4-2 (without retention aids) in Experiment 3 (magnification: 3000×; right: electron micrograph, left: elemental map).

(4) Sample 4 (FIG. 6): A complex was synthesized in the same manner as described in (2) above except that the concentration of phosphoric acid was 60%, and the amount of phosphoric acid added was 9.5 g.

The complexes obtained as described above were washed with ethanol three times, and then observed with an electron microscope. The results are depicted in FIGS. 3 to 6, showing that a calcium phosphate having a primary particle size in the order of 0.5 to 2.5 μm adhered to the fiber in each complex. The particle size of the calcium phosphate that adhered to the fiber was in the order of 0.2 to 1 μm in Samples 1 and 2, in the order of 0.5 to 2 μm in Sample 3, and in the order of 0.5 to 2.5 μm in Sample 4.

Experiment 3: Preparation and Evaluation of Complex Sheets

<Preparation of Complex Sheets>

The complexes prepared in Experiment 1 and Experiment 2 (Sample A, Samples 1 to 4) were formed into sheets by the following procedure (basis weight: about 60 $g/m^2$).

For samples containing retention aids, a suspension was prepared by stirring at 500 rpm with 100 ppm of a cationic retention aid (ND300 from HYMO CORPORATION) and 100 ppm of an anionic retention aid (FA230 from HYMO CORPORATION). A complex sheet having a basis weight of about 60 $g/m^2$ was prepared from the resulting suspension according to JIS P 8222. For samples containing no retention aids, a slurry of each complex was used to prepare a complex sheet having a basis weight of about 60 $g/m^2$ (Sheets #2-2 and #4-2).

<Evaluation of the Complex Sheets>

The sheets obtained were analyzed by SEM-EDS, and the results are shown in FIGS. 7 to 12. The results of SEM-EDS analysis showed that titanium was distributed and adhered onto the sheets in the samples containing titanium (the blue areas in the elemental maps correspond to titanium).

As shown in the table below, the molar ratio of elements calculated from the initial ratio (Samples 1 and 3: P 29%, Ca 71%; Samples 2 and 4: P 25%, Ca 62%, Ti 13%) approximately coincided with the molar ratio of elements determined from SEM-EDS of the sample surfaces, irrespective of whether or not retention aids were added. It is generally considered difficult for papers to show high retention of titanium if it is internally added, but titanium could be retained in the sheets efficiently without using any chemicals by using the complexes as provided by the present invention.

TABLE 1

Results of elemental analysis by SEM-EDS

| | Sheet | | | | | | |
|---|---|---|---|---|---|---|---|
| | #1 | #2-1 | #2-2 | #3 | #4-1 | #4-2 | #5 |
| Complex | Sample 1 | Sample 2 | Sample 2 | Sample 3 | Sample 4 | Sample 4 | Sample A |
| Titanium | No | Yes | Yes | No | Yes | Yes | No |
| Retention aids | Yes | Yes | No | Yes | Yes | No | Yes |
| P (mol %) | 33 | 30 | 30 | 33 | 32 | 31 | — |
| Ca (mol %) | 67 | 63 | 64 | 67 | 61 | 66 | — |
| Ti (mol %) | 0 | 7 | 7 | 0 | 7 | 4 | — |

The properties of the resulting sheets were determined by the methods described below and the evaluation results are shown in Table 2. The sheets of the calcium phosphate complexes showed improved opacity as compared with the sheet of the complex of precipitated calcium carbonate microparticles that had not been converted into a phosphate (#5). Further, the sheets of the calcium phosphate complexes were bulky and had high bending stiffness.

Basis weight: JIS P 8124: 1998
Thickness: JIS P 8118: 1998
Density: calculated from the measured thickness and basis weight
Ash content: JIS P 8251: 2003
Brightness: JIS P 8212: 1998
Opacity: JIS P 8149: 2000
Specific scattering coefficient: calculated by the equation defined in TAPPI T425 (ISO 9416)
Air resistance: JIS P8117: 2009
Smoothness: JIS P 8155: 2010
L&W bending stiffness: The bending stiffness was measured at a bending angle of 15° according to ISO-2493 using L&W Bending Tester (from Lorentzen & Wettre)
Breaking length: JIS P 8113: 2006
BET specific surface area: calculated by nitrogen adsorption using Micrometrics Gemini 2360 (from Shimadzu Corporation).

TABLE 2

Properties of complex sheets

| Sheet | | #1 | #2-1 | #3 | #4-1 | #5 |
|---|---|---|---|---|---|---|
| Basis weight | (g/m2) | 63.7 | 64.0 | 62.3 | 63.4 | 62.4 |
| Density | (g/cm3) | 0.47 | 0.40 | 0.47 | 0.41 | 0.62 |
| Ash content | (%) | 46.6 | 48.4 | 50.1 | 51.3 | 44.2 |
| Brightness | (%) | 90.3 | 90.6 | 90.6 | 90.9 | 88.8 |
| Opacity | (%) | 88.6 | 89.7 | 90.8 | 91.7 | 81.7 |
| Specific scattering coefficient | (m2/kg) | 79.6 | 86.5 | 98.6 | 106.5 | 49.6 |
| Air resistance | (sec) | 33 | 20 | 26 | 19 | 8 |
| Smoothness | (sec) | 11 | 12 | 11 | 11 | 8 |
| Breaking length | (km) | 0.8 | 0.7 | 0.7 | 0.5 | 1.5 |
| L&W bending stiffness | (μN · m) | 112 | 149 | 97 | 127 | 64 |
| BET specific surface area | (m2/g) | 49.5 | 52.6 | 55.0 | 56.0 | 13.7 |

The invention claimed is:

1. A process for preparing a complex comprising calcium phosphate particles having an average primary particle size of 5 μm or less adhered to the surface of a fiber, the process comprising:

synthesizing a calcium carbonate in a solution containing a fiber to give a complex of calcium carbonate particles having an average primary particle size of less than 5 μm and the fiber; and reacting the complex of calcium carbonate particles with phosphoric acid to give a complex of a calcium phosphate and the fiber; wherein the proportion of phosphoric acid is 10 to 100%, based on the solids content of calcium carbonate;

wherein 15% or more of the surface of the fiber is covered by the calcium phosphate.

2. The process of claim 1, comprising synthesizing a calcium carbonate in a solution containing a fiber in the presence of cavitation bubbles.

3. The process of claim 1, wherein the calcium carbonate particles have an average primary particle size of 1 μm or less.

4. The process of claim 1, comprising synthesizing a calcium carbonate by reacting an aqueous suspension of slaked lime and a gas containing carbon dioxide in the presence of cavitation bubbles.

5. The process of claim 4, wherein the cavitation bubbles are generated by injecting a liquid into a reaction vessel.

6. The process of claim 1, wherein the fiber comprises a pulp fiber.

7. The process of claim 5, wherein the liquid is an aqueous suspension of slaked lime.

8. The process of claim 7, wherein the liquid is circulated from the reaction vessel.

9. The process of claim 1, comprising reacting phosphoric acid in the presence of titanium to give a calcium phosphate-fiber complex comprising titanium.

10. The process of claim 1, wherein the proportion of phosphoric acid is 20 to 60%, based on the solids content of calcium carbonate.

* * * * *